United States Patent
Seshadri

(10) Patent No.: US 7,269,848 B2
(45) Date of Patent: Sep. 11, 2007

(54) METHOD AND SYSTEM FOR ACCESS TO DEVELOPMENT ENVIRONMENT OF ANOTHER IN A SECURE ZONE

(75) Inventor: Omkumar Seshadri, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 768 days.

(21) Appl. No.: 10/615,103

(22) Filed: Jul. 8, 2003

(65) Prior Publication Data
US 2004/0221179 A1 Nov. 4, 2004

(51) Int. Cl.
G06F 9/00 (2006.01)
(52) U.S. Cl. .......................... 726/12; 726/15; 370/351
(58) Field of Classification Search .................. 726/11, 726/12, 15; 370/351
See application file for complete search history.

(56) References Cited

U.S. PATENT DOCUMENTS 6,606,744 B1 * 8/2003 Mikurak ..................... 717/174
6,671,818 B1 * 12/2003 Mikurak ......................... 714/4
2004/0064351 A1 * 4/2004 Mikurak ......................... 705/7

* cited by examiner

Primary Examiner—Kim Vu
Assistant Examiner—April Shan
(74) Attorney, Agent, or Firm—W. James Brady; Frederick J. Telecky, Jr.

(57) ABSTRACT

A "Design Zones" system provides a highly secure common resource computing environment or design zone with services on the common resource or design zone being protected by multiple layers of security to engagement boxes with the computing environment where the partners can work simultaneously in multiple teams, run simulation tests, emulate software problems and share in a secure zone with just the remote display going back to the engagement box and therefore to the partner outside the owner. A method is described herein to provide access to EDA licenses managed by software daemon manager running on license servers inside an Intranet separated from the design zone by a firewall without opening all TCP inbound connections inside the TI Intranet for ports greater than 1023 from all the hosts in contractor or design zone on which EDA applications are run comprises a license proxy server inside the design zone that acts as a relay agent and route all the connections from contractor zone into the owner's Intranet.

5 Claims, 6 Drawing Sheets

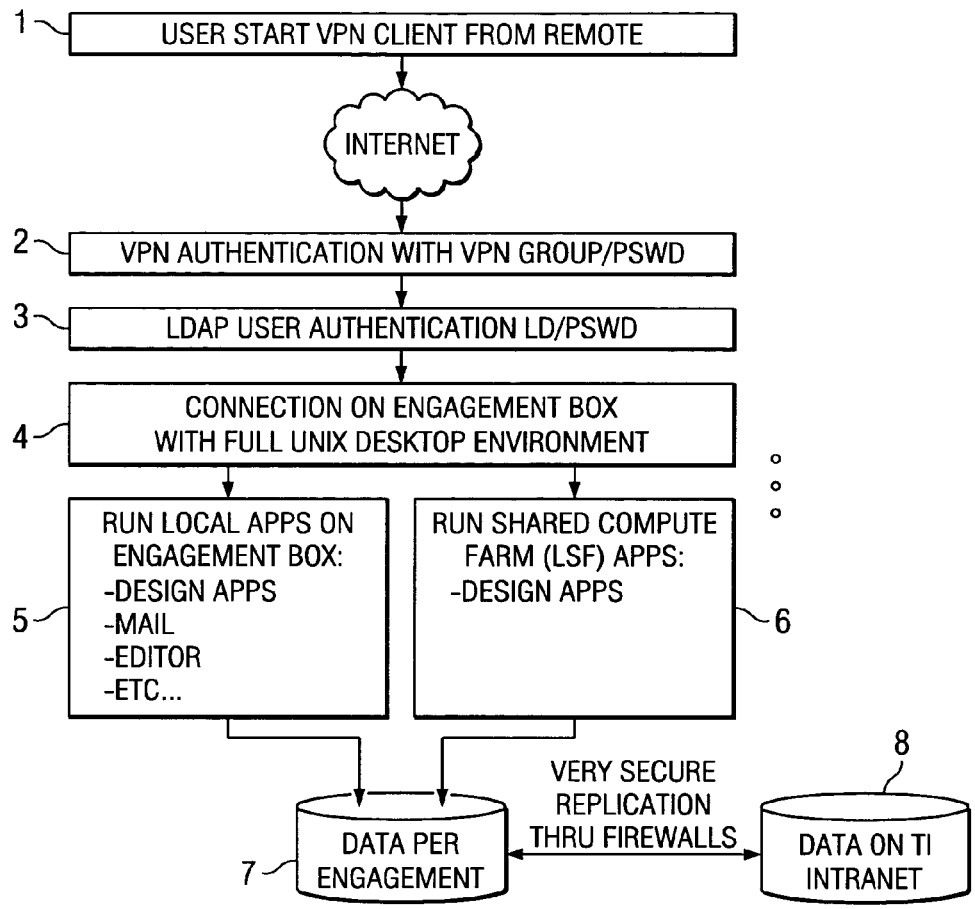
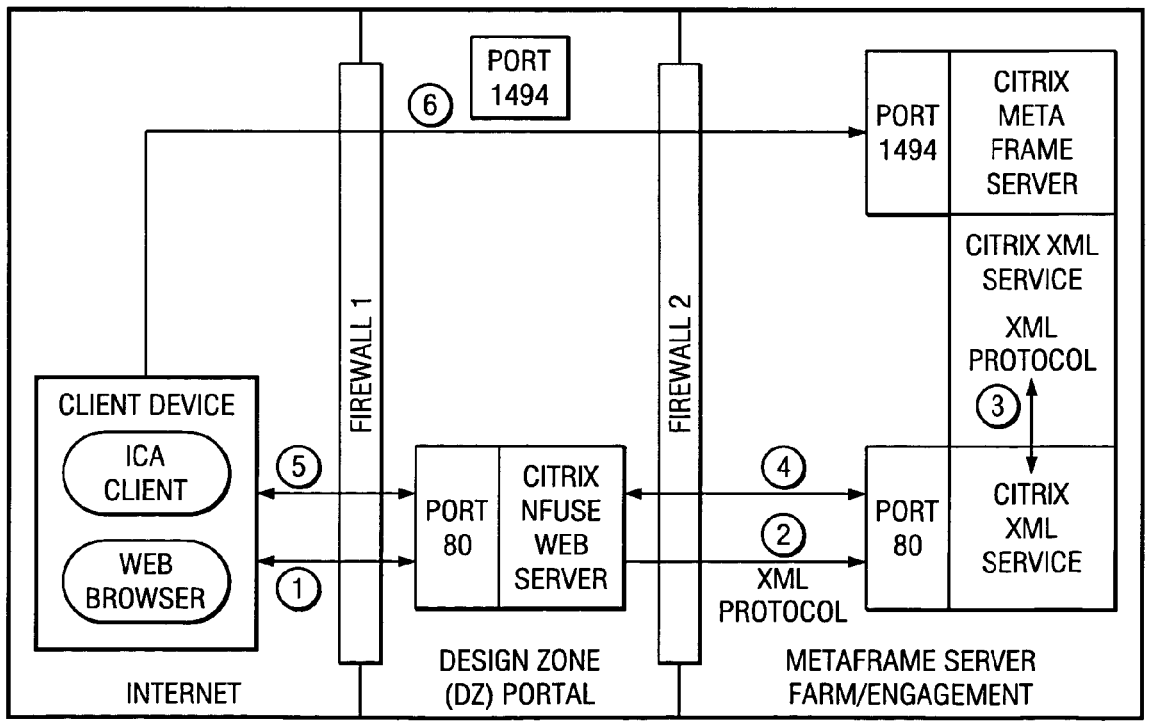

METHOD AND SYSTEM FOR ACCESS TO DEVELOPMENT ENVIRONMENT OF ANOTHER IN A SECURE ZONE

CROSS-REFERENCE TO RELATED APPLICATIONS

This application is related to co-pending patent application Ser. No. 10/615,263 filed on Jul. 8, 2003 and the same date as this present application and this co-pending application claims the benefit of European patent application serial no. 03291079.6 filed May 2, 2003 entitled "Method and System for Access to Development Environment of Another" and which is also assigned to Texas Instruments Incorporated.

FIELD OF INVENTION

This invention relates to a method and system for access to the development environment of another using a secure design zone and the Internet and more particularly to provide access from hosts in the secure zone to servers inside an Intranet.

BACKGROUND OF INVENTION

The complexity of system designs is increasing exponentially. This is particularly a concern for integrated circuit manufacturers such as Texas Instruments Incorporated. The time to market is more and more critical for success. It is believed that collaboration with customers and suppliers is the key to faster, easier, cheaper and more accurate interactions.

The collaboration can be improved by allowing the customers and suppliers (partners) to use their compute resources. The problem with that is having the data leaving the owner for validating, simulation, layout, etc.

It is therefore an object of the present invention for manufacturer's such as Texas Instruments Incorporated to give access to partners such as sub-contractors, customers and Electronic Design Automation (EDA) vendors to the manufacturer's design systems computing environment without compromising Intellectual Property.

In accordance with one embodiment of the present invention access from partner's sub-contractors, customers and Electronic Design Automation (EDA) vendors to a manufacturer's (owner's) such as Texas instruments Incorporated design systems computing environment without compromising Intellectual Property is provided by a full suite of web-based services from design to production is provided by a highly secure network including a VPN tunnel between workstations to establish a secure encrypted tunnel end to end wherein each partner is identified with a different VPN group/password.

In accordance with an embodiment of the present invention a method of enabling collaboration by owners of a collaborative network with partners such as sub-contractors, customers and/or Electronic Design Automation (EDA) vendors without compromising Intellectual Property is provided herein by providing by the owner a highly secure common resource computing environment with services from design to production wherein data input and output remains on the common resource. The highly secure resource is provided by multiple layers of security to engagement boxes with the computing environment where the partners can work simultaneously in multiple teams, run simulation tests, emulate software problems and share intellectual property in a secure zone with just the remote display going back to the engagement box and therefore to the partner outside the owner.

While executing outsourcing projects in design zones described above and in co-pending application Ser. No. 10/615,263 filed on Jul. 8, 2003 and in European patent application serial no. 03291079.6 filed May 2, 2003 entitled "Method and System for Access to Development Environment of Another", it is required to provide access to EDA licenses managed by FLEXLM manager running on license servers inside design zone owner's Intranet. These applications are incorporated herein by reference. This requires opening all TCP inbound connections inside the Intranet for ports greater than 1023 from all the hosts in contractor zone on which EDA applications are run. This is considered very insecure. In accordance with another embodiment of the present invention a license proxy software is provided that will act as a relay agent and route all the connections from contractor zone into the Intranet.

DESCRIPTION OF DRAWING

FIG. 2 is a flow diagram according to one embodiment of the present invention.

FIG. 3 illustrates how a session is started on a port and when authenticated data is sent on a different port.

DESCRIPTION OF PREFERRED EMBODIMENTS

According to one embodiment of the present invention access from sub-contractors, customers and Electronic Design Automation (EDA) vendors to the manufacturer's such as Texas Instruments Incorporated computing environment without compromising Intellectual Property is provided by a full suite of web-based services from design to production. This interactive design compute environment in which customers can work jointly with the technical people and other representatives of Texas Instruments. to create and test designs in a highly secure "Design Zones" promote collaboration between Texas Instruments (the manufacturer and owner of the computing environment) and its customers and offer flexibility in the compute and design process. Because the zones are so secure, they help giving customers the confidence the customers need to share design intellectual property with Texas Instruments Incorporated representatives and subcontractors for the purpose of completing a project and increasing the value of a joint design.

Design zones allow designers with access to the zones to compute as they would from a common UNIX desktop. They log in to a highly secure Texas Instruments Incorporated network through the Internet, direct leased lines and/or the Texas Instruments Incorporated Intranet. They must pass through multiple layers of security. Once they reach the "engagement zones" Texas Instruments engineers and other representatives and their business partners can work simultaneously in multiple teams, run simulation tests, emulate software problems and share intellectual property in a secure zone.

Figure 1:
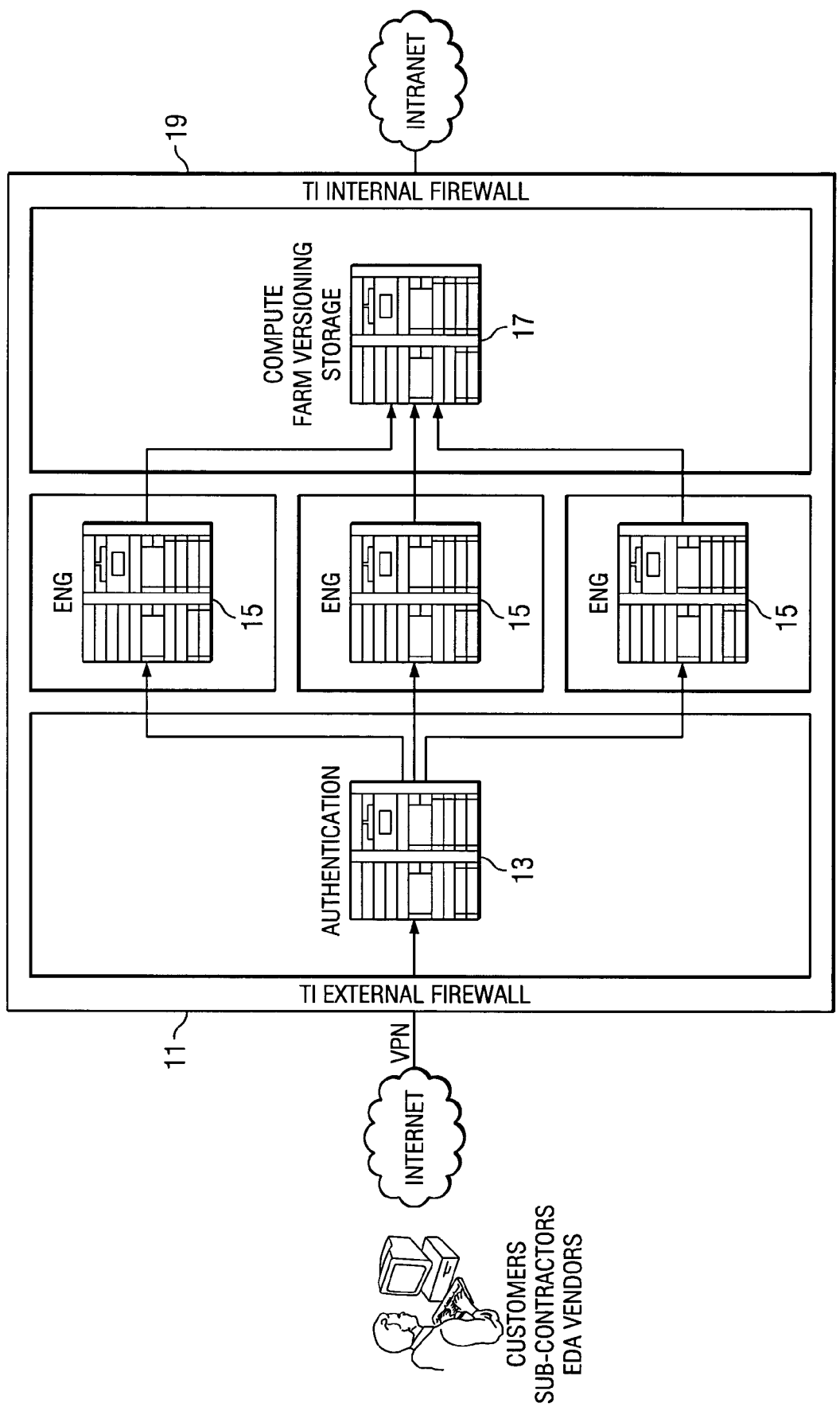
FIG. 1 illustrates access to the compute farm versioning storage according to one embodiment of the present invention.

FIG. 1 illustrates Customers, Sub-contractors, and EDA Vendors (partners) accessing the Internet and through the VPN and TI external firewall 11 to the authentication 13. The access after authentication the communication then passes on to the appropriate isolated engagement boxes 15 and to the computer farm versioning storage 17. All machines in the system cannot access Texas Instruments Incorporated Intranet. They are blocked by the TI internal firewall 19 with the exception of the Network Time Protocol, license machines for EDA applications and a few Mail functionalities (SMPT port 25). Data produced in the system is replicated internally through the backend network or through the outside perimeter on a regular basis, and this is always initiated from inside, namely from the Intranet.

A Texas Instruments Design Zone security administrator monitors the activities to make sure no information leaves the site. Design engineers are restricted from removing any intellectual property from the engagement zone and a security administrator controls all movements of data. For added protection, a "co-session" management tool allows the designated zone lead engineer to monitor what the parties are doing in the zone.

Referring to FIG. 2, a flow chart of the process is illustrated. The user partner (Step 1) starts a Virtual Private Network (VPN) client from a remote. A VPN is a wide area communication network provided by a common carrier that provides what seems like dedicated lines when used, but backbone trunks are shared among all customers as in a public network. A VPN tunnel is established between the partners (customers and suppliers) workstations (any machine that can run VPN software) to establish a secure encrypted tunnel end to end (VPN concentrator). A VPN concentrator joins several communications channels together. Each partner is identified with a different VPN group/password (Step 2). A tunnel simply refers to a single logical channel over which sessions that normally do not share a logical channel are sent. The tunnel created in a VPN connection is a logical point-to-point connection that supports authentication and encryption of data from one endpoint of the tunnel to the other. The tunneling hides the original packet inside a new packet. For routing through the tunnel, the address of the tunnel endpoint is provided in the outside (new) packet's header, which is called the encapsulation header. The final destination address is inside, in the original packet's header. When the packet reaches the tunnel's endpoint destination, the encapsulation header is stripped off and the original packet delivered to the final destination. Tunnels can be established at different layer such as data link layer or network layer. In VPN there are three types of protocols. There is the tunneling protocol to establish the tunnel. The encryption protocol is used to secure the data. There is the network/transport protocol or LAN protocol to communicate on the private network. The VPN is the first level of authentication.

Partners start a session in a Worldwide Web (Web) page using thin client technology such as Citrix Independent Computing Architecture (ICA). This session launch on a Portal machine that will authenticate through Lightweight Directory Access Protocol (LDAP) the user/password of the person (Step 3). The LDAP allows the directory user agent to give users access to directory services to communicate with the directory system agent that manages the directory data. This is the second level of authentication.

Depending on the person identified by the LDAP in Step 3 above, the session will be routed to one of many engagement boxes that are on the Ethernet segments separated by Firewall boxes where in Step 4 another login/password is required and is validated thru LDAP. LDAP boxes are on the common resource segments. All users of the same partner are all launching on the same engagement box, which guarantee a high level of security. From that engagement box they have access to data and applications on the Network File System (NFS) storage system (Step 7) and access is also controlled by the LDAP mechanism for security purposes. NFS is a distributed file system from SunSoft that allows data to be shared across a network regardless of machine, operating system, network architecture or protocol. This de facto UNIX standard lets remote files appear as if they were local on a user's machine. The partners can run local applications on the engagement box (Step 5) such as design applications, mail, editor, etc or on the server farm (Step 6) that resides on the common resources segment for bigger batch or interactive jobs. Doing that, data input and output remains on the common resource, just the remote display is going back to the engagement box (X11 protocol) and therefore to the partner outside the owner (ICA) such as Texas Instruments Incorporated. All critical data remains in the Texas instruments Incorporated premises design zone. All machines in the design zone cannot access the TI Intranet because they are blocked by the firewall 19 with the exception of the Network Time Protocol, license machines for EDA applications and a few mail functionalities (SMTP port 25). Data produced in the system is replicated internally through the backend network or through the outside perimeter on a regular basis, and this is always initiated from inside, namely from the TI Intranet via the TI internal firewall. As discussed previously a Design Zone security administrator monitors the activities to make sure no information leaves the site and design engineers are restricted from removing any intellectual property from the engagement zone and the security administrator controls all movements of data. For added protection, a "co-session" management tool allows the designated zone lead engineer to monitor what the parties are doing in the zone.

FIG. 3 illustrates an example of how a session is started on port 80 and then when session is authenticated data are going on to port 1494. The client device on the Internet containing the ICA client and the web browser communicates with the Citrix NFuse Web server at port 80 in the design zone portal through the first firewall (Firewall 1). NFuse enables one to integrate interactive applications into standard Web browsers such as Netscape or Microsoft Internet Explorer. The web server communicates using the XML protocol to port 80 on server farm through the second firewall (Firewall 2) and responds back. NFuse also enables joining several servers in a group to create the server farm. Note the Citrix MetaFrame Sever in the farm or engagement. Within the farm, one can perform load balancing, license pooling, and application publishing. When the session is authenticated data can be sent on a different port 1498.

Figure 4A:
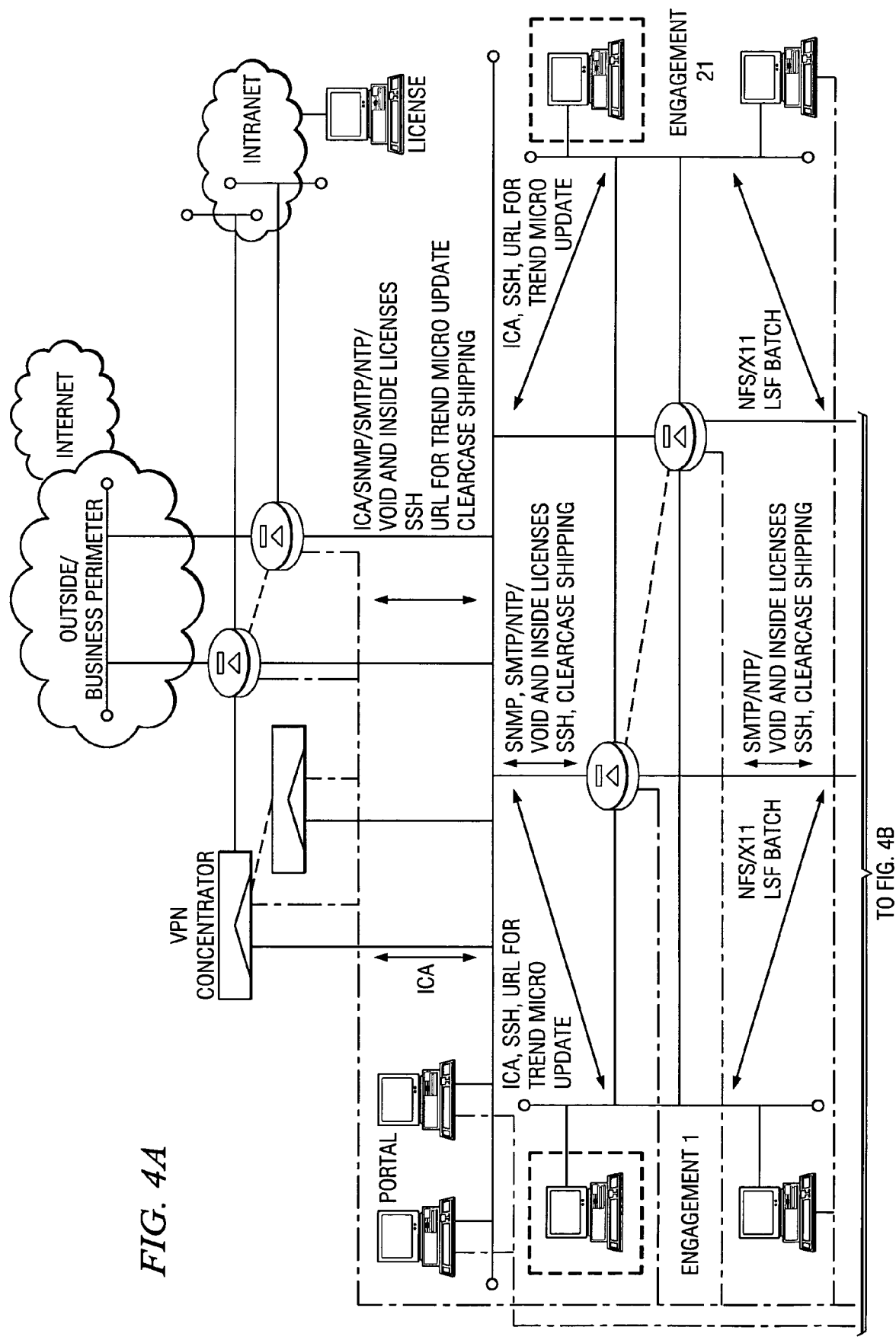
FIGS. 4A and 4B illustrate a system design according to one embodiment of the present invention and illustrates which protocols are allowed from where to where to guarantee security.
Figure 4B:
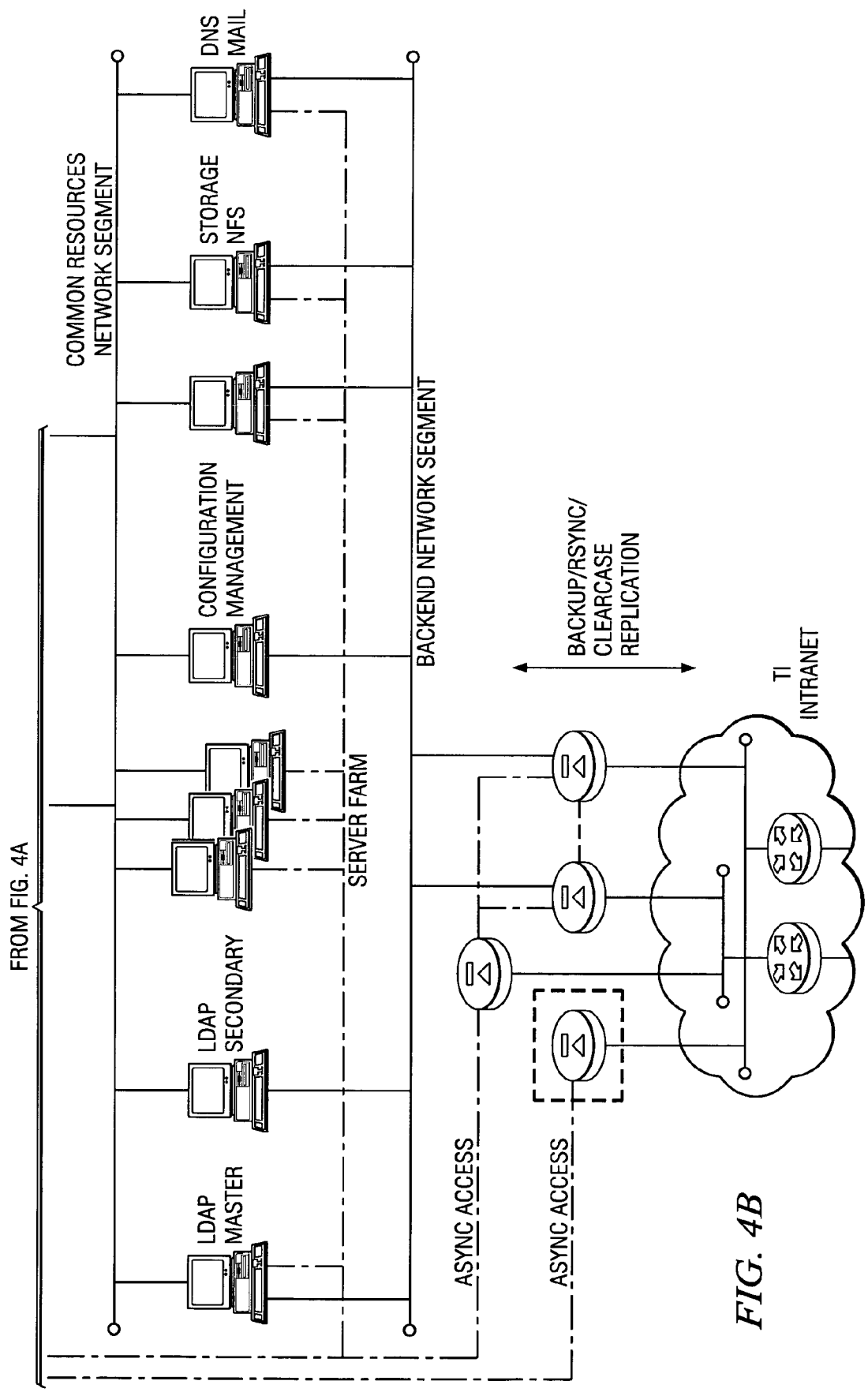

FIGS. 4A and 4B is a schematic diagram of the system and illustrates which protocol is allowed from where to where to guarantee security. The partners may access through the outside/business perimeter using the Internet as illustrated at the top of the drawing. A licensee may access the system trough an Intranet link. The access is through routers and thru secure mechanism such as SSH. SSH utilizes strong encryption and authentication. SSH can be installed on a private network's firewall, and a tunnel can be established from SSH client with dialup Internet access to the firewall. The input from the Internet is through VPN concentrator using a VPN tunnel. The Partners start an ICA session in a WEB page. This session is launched on a Portal machine that will authenticate through Lightweight Directory Access Protocol (LDAP) a user identification and password of the user. Depending on the user that will authenticate through Lightweight Directory Access Protocol (LDAP) by the user identification password of the user, then another login/password is required and is validated thru another LDAP. All users of the same partner are all launching on the same engagement box, which guarantee a high level of security. This is the second LDAP and third level of security. From that box they have access to data and applications on the Network File System (NFS) storage thru a LDAP mechanism for security purposes. There are illustrated engagement boxes 1 thru 21. The common resource segment includes the server farm, the storage NFS, DNS mail, the LDAP master and secondary LDAP. The backend Network segment includes the TI or owner's Intranet. This backend segment is mostly used for backup purposes of data in common resources as well as for data replication between Intranet and Common resource area. The async access box is used for management of all the critical boxes in the Design Zone from the Intranet thru a Terminal server box to guarantee security.

Figure 5:
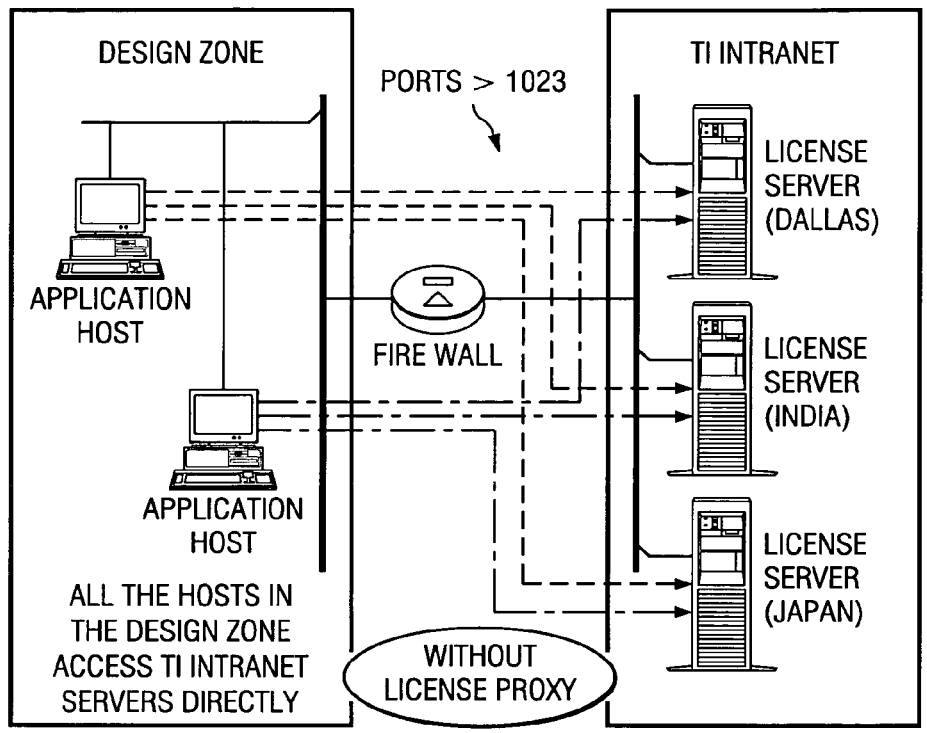
FIG. 5 illustrates the flow without license proxy server.

All EDA licenses are controlled by license manager software called "FLEXLM." It has a manager and the vendor daemon. The vendor daemon and the manager daemon run on the same license server inside the Intranet. The manager daemon listens on a known TCP port that is greater than 1023. When an EDA application initializes a connection to this known port, FLEXLM replies back with the port on which the vendor daemon is listening on. This port on which the vendor daemon is listening is a dynamic port and it cannot be determined or configured through any setup files. The EDA application then initializes another connection to this vendor license and fetches the license. In the design zone scenario the application run on a host inside the secure zone and the FLEXLM and vendor daemons run on license servers inside the TI intranet as illustrated in FIG. 5. The application hosts are in the "Metaframe server farm/ engagement subnet. In TCP/IP networking there are privilege ports and non-privilege ports. Privilege ports are those below 1023. To get access to these ports one needs a super user privilege. It is through these ports one gets access to services like TELNET, FTP, and HTTP etc. On all ports greater than 1023 any user of Unix can write a small program that can run as a server process and accept connections from clients to give information. Because of this security issue access to ports greater than 1023 is usually closed. To enable EDA license access the firewall to the Intranet needs to be wide open for all ports greater than 1023 for all hosts in the design zone. This is a potential security risk.

Figure 6:
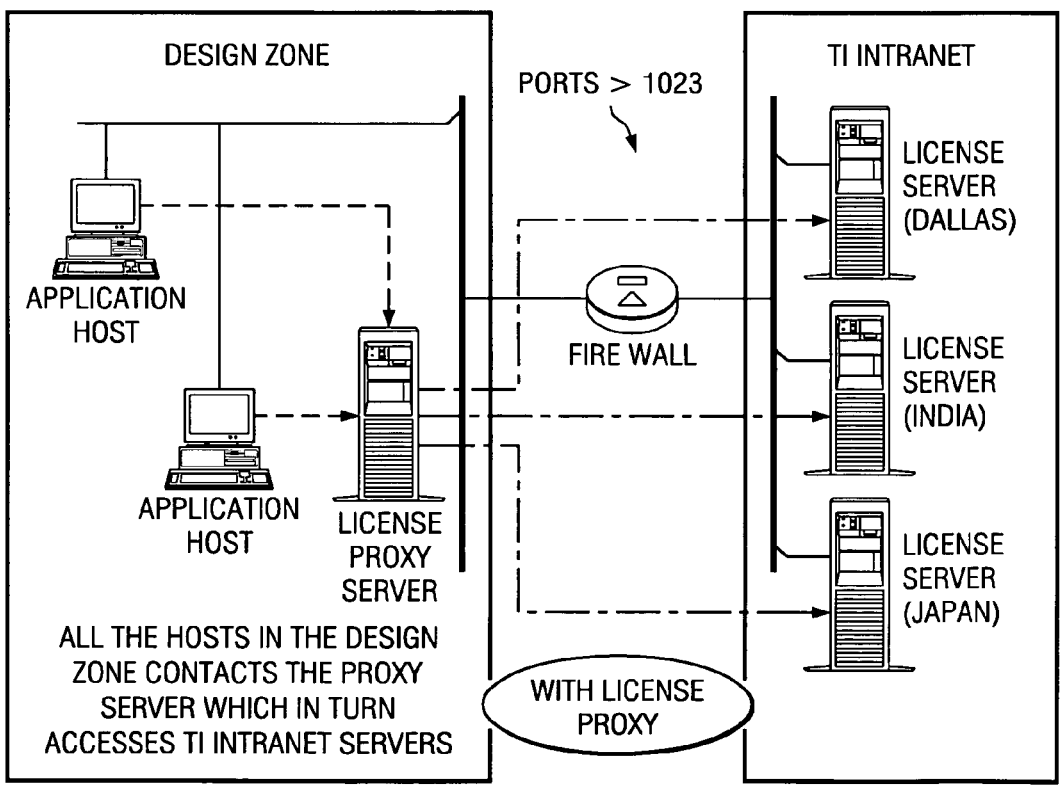
FIG. 6 illustrates the flow with a license proxy server according to one embodiment of the present invention.

In accordance with an embodiment of the present invention to improve the security, a license proxy software in "C" language is provided that will act as a relay and route all connections from contractor zone into TI Intranet as illustrated in FIG. 6. The proxy server intercepts the data packets to learn the vendor daemon ports and dynamically relays the requests. With this setup it is enough to just open the required ports for the license proxy server alone instead of all the hosts in the design zone.

Inside the design zone, the license server names and IP addresses are aliased to the proxy server. Due to this, the application hosts contacts the proxy server instead of the intranet servers. The proxy server knows the actual IP addresses of the license servers in the intranet. The license proxy is in a common resource subnet in the design zones. The application hosts inside the design zone contacts the license proxy server which in turn fetches the licenses from the TI intranet.

The flow is as follows: The application host initiates a connection to the proxy server. The proxy server, in turn, initiates the connection to the actual license server in the intranet and relays the packets between the license server and application hosts. The license server sends the port number of the vendor daemon in the reply packet. The proxy server intercepts this packet and reads the port number. The proxy server creates another listening socket on the same port as the vendor port. The application host now initiates the connection to the vendor port on the proxy server, which, in turn, initiates a connection to the vendor port on the license server and relays the packets back and forth.

It also checks if the communication between the application hosts and the license server is only a license request. All the license request packets are exactly 147 bytes in length. This check is made on all packets that are relayed between the application hosts and the license server.

This license proxy server is run on a hardened server and the only TCP connections that need to be enabled to reach the Intranet are those from this host where the proxy is running. The proxy server can support accounting of software licenses and restrictions can be imposed for selected EDA tools based on the secure host.

While executing outsourcing projects in Design Zones it is required to provide WEB access to HTTP pages on TI Intranet web servers in the contractor zone. Opening up the TCP port 80 on the firewall to let the contractor hosts reach all the Intranet servers is an insecure configuration.

A web proxy server in PERL is provided which acts as a relay between the contractor servers and TI Intranet web servers and to fetch the requested pages. The server on which the web proxy is run is trusted and this is the only server that needs to be enabled access into the TI Intranet. This makes the architecture more secure. The web proxy server is written in PERL to allow restricted access to specific intranet sites based on the IP address of the source (host from which a browser is opened). It uses a simple lookup table like the one below:

199.33.184.71 web address with.india.ti.com~omkumar/ XID/GET NONE 199.33.184.11 web address with India.ti.com/sysadmin/ars/ .*GET POST A host with IP address 199.33.184.71 can access only the top level page of URL with web address with india.ti.com/ ~omkumar/XID. He cannot access any link within the main page. Every link a host needs to access should be explicitly declared in this table.

A host with IP address 199.33.184.11 can access the page: 199.33.184.11 web address with India.ti.comsysadmin/ars and also use POST method to run CGI programs and exchange data. If NONE is specified instead of POST, then no CGI programs are allowed to be executed.

The WEB proxy server is placed in the design zone and it relays the requests on behalf of the application hosts. On the firewall the ports are opened up only for the web proxy server to access the intranet web servers. This tightens the security of the design zone.

Figure 7:
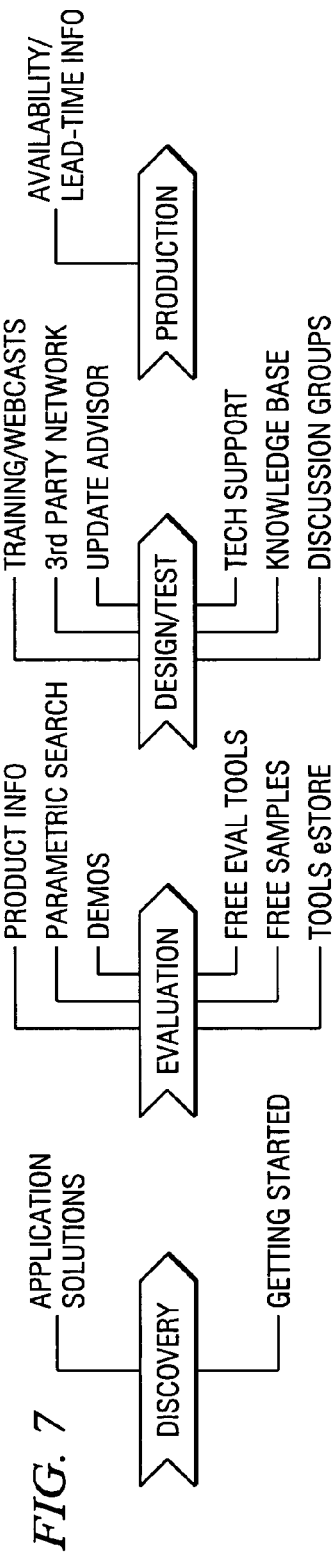
FIG. 7 illustrates the collaborative web-based services from design to production.

Texas Instrument provides a full suite of web-based services to customers who do not have the system capability to connect directly to Texas Instruments networks. FIG. 7 illustrates the collaborative web-based services from design to production. At the discovery stage there are presented application solutions. At the evaluation stage there is product information, parametric search, demos, free evaluation tools, free samples and tools eStore. At the design/test stage there is training/Webcasts, third party network, update advisor, technical support, knowledge base and discussion groups. At the production stage there is availability information and lead time information.

Figure 8:
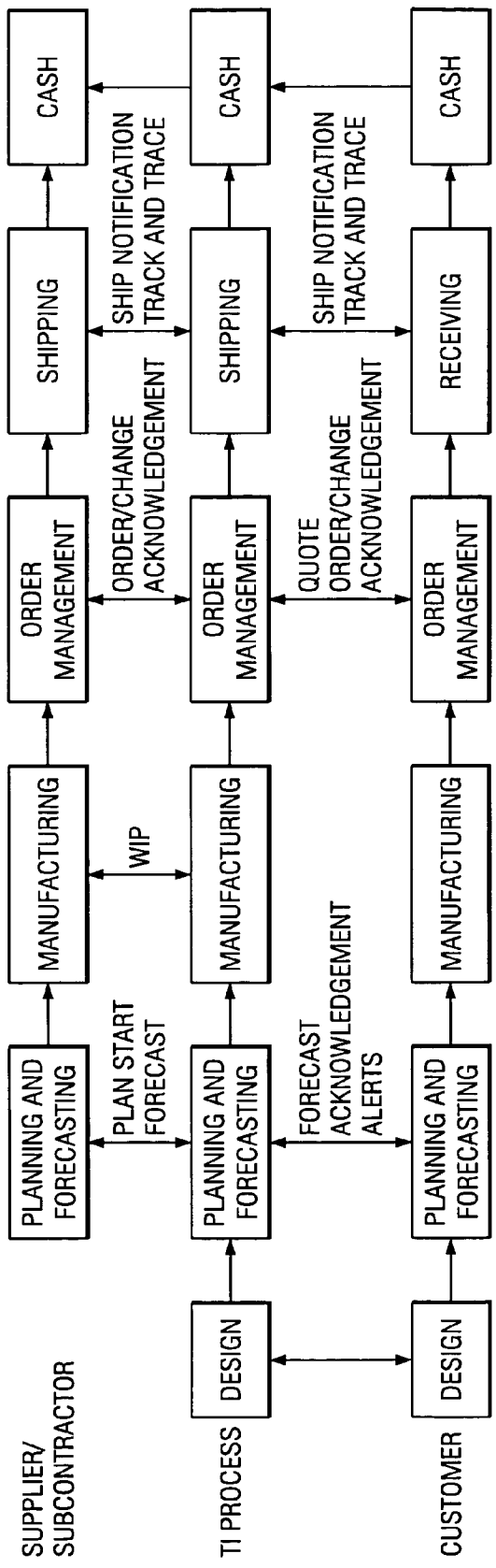
FIG. 8 illustrates collaborative process services from design through shipping and receiving.

FIG. 8 illustrates the collaborative process from design through shipping and receiving. In the design stage the collaborative design services include secure collaborative design zones, linked IT infrastructures across design partners, web-based program management and product delivery workflow tools and customer co-simulations and consolidated design storage. During planning and forecasting the services are short and long term forecasting and response, proactive messaging/alerts, replenishment models adapted to customer needs, and leading on RosettaNet standards related to planning and forecasting. During order management the services are quote management (create and change), order management (create and change and status), order acknowledgements, material tracking (ship notices, inventory, WIP), and leading on EDI, RosettaNet, and barcode standards usage and definition. The collaborative services for supplier for manufacturing include electronic-catalog for self-service ordering, multiple integration options (EDI/RosettaNet, XML or Web), Web contract management, material specification available via the Web, Web PO, invoice and acknowledgement, and logistics track and trace. The collaborative services for subcontractors for manufacturing include forecast management, purchase order management, inventory management, planning management, receiving management and shipment tracking. The distributor collaboration services during shipping and receiving include multiple integration options (EDI, RosettaNet, Web), quote management (create and change), order management (create, change, and status), order acknowledgements, shipment notices and tracking, price list, ship and debit processing, design registration, inventory reporting and resale management.

While the invention has been particularly shown and described with reference to a preferred embodiment, it will be understood by those skilled in the art that various changes in form and detail may be made without departing from the spirit and scope of the invention.

The invention claimed is:

1. A method for providing a secure access of a partner to the development environment of an owner comprising the steps of: starting a VPN tunnel between workstations to establish a secure encrypted tunnel end to end wherein each partner is identified with a different VPN group/password; starting a session by the partner in a Web page on a portal machine that authenticates through LDAP (Lightweight Directory Access Protocol) a user identification and password of user; routing the session to an engagement box depending on the user where the engagement boxes each include a server with an operating system and are on network segments separated by firewall boxes with another logon/password and is validated through second LDAP and wherein all users of the same partner are all launching on the same engagement box; accessing data and applications from an engagement box on Network File system storage authenticated second LDAP to a design zone common resource of said owner with a big compute farm composed of many high-end servers in a secure way, submitting batch or interactive jobs to said design zone; and providing for each application host in said design zone a highly secure access to EDA licenses from license servers with dynamically changing access ports of said owner inside an Intranet of said owner without opening all such access ports for all hosts and creating a security risk comprising the steps of:
   providing a license proxy server in said design zone that dynamically determines the addresses of the changing access ports of the license servers in said Intranet; and
   said application hosts inside said design zone contacting the license proxy server which in turn fetches the appropriate EDA licenses from said license servers in said Intranet of said owner.

2. A method to provide secure access by application hosts in a design zone to EDA licenses managed by software daemon manager running FLEXLM on license servers behind a firewall inside an Intranet of an owner without opening all inbound ports greater than 1023 from all the hosts in the design zone on which EDA applications are run, where FLEXLM has a manager daemon and a vendor daemon and said vendor daemon has a random changing port number above 1023 for access and said manager daemon listens on a known TCP port that is greater than 1023 and when an application host makes a connection to this known port FLEXLM replies back with the port on which the vendor daemon is listening, comprising the steps of:
   providing a license proxy server inside the design zone that listens on the FLEXLM manager port;
   intercepting EDA license requests by the application host by said proxy server and said proxy server initiating a connection to said manager daemon of said license server on behalf of the application host and FLEXLM responding with port number of the vendor daemon in a reply packet;
   said proxy server intercepting this packet and reading the port number and creating another listening socket on the same port as the vendor port, and
   said application host initiating a connection to the vendor port on the proxy server which in turn initiates a connection to the vendor port on the license server and relays the packets back and forth between the application hosts and the appropriate license server.

3. A system for providing a secure access of one or more partners to the development environment of an owner comprising:
   means for starting a VPN tunnel between workstations to establish a secure encrypted tunnel end to end wherein each partner is identified with a different VPN group/password;
   means for starting a session by the partner in a Web page on a portal machine that authenticates through LDAP (Lightweight Directory Access Protocol) a user identification and password of a user;
   means for routing the session to an engagement box depending on the user where the engagement boxes each include a server with an operating system and are on network segments separated by firewall boxes with another logonlpassword and is validated through second LDAP and wherein all users of the same partner are all launching on the same engagement box;
   means for accessing data and applications from an engagement box on Network File system storage authenticated second LDAP to a design zone common resource of said owner with a big compute farm composed of many high-end servers in a secure way;
   means for submitting batch or interactive jobs to said design zone; and means for providing for each application host in said design zone a highly secure access to EDA licenses from license servers with dynamically changing access ports of said owner inside an Intranet of said owner without opening all such access ports for all hosts and creating security risk comprising:

a license proxy server in said design zone that determines the dynamically changing access ports of the license servers in said Intranet; and said application hosts inside said design zone contacting the license proxy server which in turn fetches the appropriate EDA licenses from said license servers in said Intranet of said owner.

4. A method for providing a secure access of one or more partners to the development environment of an owner comprising the steps of:

starting a VPN tunnel between workstations to establish a secure encrypted tunnel end to end wherein each partner is identified with a different VPN group/password;

starting a session by the partner in a Web page on a portal machine that authenticates through LDAP (Lightweight Directory Access Protocol) a user identification and password of a user;

routing the session to an engagement box depending on the user where the engagement boxes each include a server with an operating system and are on network segments separated by firewall boxes with another logonlpassword and is validated through second LDAP and wherein all users of the same partner are all launching on the same engagement box;

accessing data and applications from an engagement box on Network File system storage authenticated second LDAP to a design zone common resource of said owner with a big compute farm composed of many high-end servers in a secure way;

submitting batch or interactive jobs to said design zone; and providing for each application hosts in said design zone a highly secure access to EDA licenses from FLEXLM controlled servers of said owner inside an Intranet of said owner without a security risk of opening all ports greater than 1023 for all hosts in the design zone, where FLEXLM has a manager daemon and a vendor daemon and said vendor daemon has a random changing port number above 1023 for access and said manager daemon listens on a known TCP port that is greater than 1023 and when an application host makes a connection to this known port FLEXLM replies back with the port on which the vendor daemon is, comprising the steps of:

providing a license proxy server inside the design zone that listens on the FLEXLM manager port and intercepts EDA license requests by the application host and initiates a connection to a manager daemon of said license server on behalf of the application host, said license manager responding with port number of the vendor daemon in a reply packet;

said proxy server intercepting said reply packet and reading the port number and creating another listening socket on the same port as the vendor port, and said application host initiating a connection to the vendor port on the proxy server and said proxy server initiating a connection to the vendor port on the license server and relays the packets back and forth between the application hosts and the appropriate license server.

5. A system for providing a secure access of one or more partners to the development environment of an owner comprising:

means for starting a VPN tunnel between workstations to establish a secure encrypted tunnel end to end wherein each partner is identified with a different VPN group/password;

means for starting a session by the partner in a Web page on a portal machine that authenticates through LDAP (Lightweight Directory Access Protocol) a user identification and password of a user;

means for routing the session to an engagement box depending on the user where the engagement boxes each include a server with an operating system and are on network segments separated by firewall boxes with another logonlpassword and is validated through second LDAP and wherein all users of the same partner are all launching on the same engagement box;

means for accessing data and applications from an engagement box on Network File system storage authenticated second LDAP to a design zone common resource of said owner with a big compute farm composed of many high-end servers in a secure way;

means for submitting batch or interactive jobs to said design zone; and means for providing for each application hosts in said design zone a highly secure access to EDA licenses from FLEXLM controlled servers of said owner inside an Intranet of said owner without a security risk of opening all ports greater than 1023 for all hosts in the design zone, where FLEXLM has a manager daemon and a vendor daemon and said vendor daemon has a random changing port number above 1023 for access and said manager daemon listens on a known TCP port that is greater than 1023 and when an application host makes a connection to this known port FLEXLM replies back with the port on which the vendor daemon is, comprising:

a licence proxy server inside the design zone that listens on the FLEXLM manager port and intercepts EDA license requests by the application host and initiates a connection to a manager daemon of said license server on behalf of the application host, said license manager daemon responding with port number of the vendor daemon in a reply packet;

said proxy server intercepting said reply packet and reading the port number and creating another listening socket on the same port as the vendor port, and said application host initiating a connection to the vendor port on the proxy server and said proxy server initiating a connection to the vendor port on the license server and relays the packets back and forth between the application hosts and the appropriate license server.

* * * * *